United States Patent
Tanner et al.

(10) Patent No.: US 11,467,009 B2
(45) Date of Patent: Oct. 11, 2022

(54) CONNECTING ELEMENT AND TRANSMITTER HOUSING WITH CONNECTING ELEMENT INSERTED THEREIN

(71) Applicant: Endress+Hauser SE+Co. KG, Maulburg (DE)

(72) Inventors: Jürgen Tanner, Kandern (DE); Michael Lais, Karlsruhe (DE); Philipp Reichert, Schopfheim (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 733 days.

(21) Appl. No.: 16/472,629

(22) PCT Filed: Nov. 22, 2017

(86) PCT No.: PCT/EP2017/080076
§ 371 (c)(1),
(2) Date: Jun. 21, 2019

(87) PCT Pub. No.: WO2018/114196
PCT Pub. Date: Jun. 28, 2018

(65) Prior Publication Data
US 2019/0360847 A1    Nov. 28, 2019

(30) Foreign Application Priority Data
Dec. 22, 2016    (DE) ..................... 10 2016 125 350.2

(51) Int. Cl.
*G01D 11/24*    (2006.01)
*H01R 13/405*    (2006.01)
(Continued)

(52) U.S. Cl.
CPC ........... *G01D 11/24* (2013.01); *H01R 13/405* (2013.01); *H01R 13/504* (2013.01); *H01R 13/5202* (2013.01)

(58) Field of Classification Search
CPC .... G01D 11/24; H01R 13/405; H01R 13/502; H01R 13/5025; H01R 13/504;
(Continued)

(56) References Cited

U.S. PATENT DOCUMENTS 6,527,989 B1 *    3/2003    Onoda ............... B29C 45/14639
                                                                  264/277
7,507,118 B2 *    3/2009    Azuma ............... H01R 13/5221
                                                                  439/701
(Continued)

FOREIGN PATENT DOCUMENTS

CN        2746573 Y    12/2005
CN        2833907 Y    11/2006
(Continued)

*Primary Examiner* — Oscar C Jimenez
(74) *Attorney, Agent, or Firm* — Christopher R. Powers; Endress+Hauser (USA) Holding Inc.

(57) ABSTRACT

The present disclosure relates to a connecting element for electrical connecting two electrical modules arranged in a transmitter housing of a field device, into which transmitter housing the connecting element is insertable, the connecting element including: at least two essentially rod-shaped metal conductor elements, each with two opposing end sections, wherein the conductor elements are arranged in a defined separation relative to one another; and surrounding the conductor elements and electrically insulating them from one another, a multi-membered insulating body including two insulating body end segments of at least a first synthetic material and an insulating body intermediate segment of a second synthetic material different from the first synthetic
(Continued)

material, wherein the first synthetic material has a modulus of elasticity greater than a modulus of elasticity of the second synthetic material.

17 Claims, 2 Drawing Sheets

(51) Int. Cl.
  *H01R 13/504* (2006.01)
  *H01R 13/52* (2006.01)
(58) Field of Classification Search
  CPC .... H01R 13/52; H01R 13/5202; H01R 43/24; H01R 33/965
  See application file for complete search history.

(56) References Cited

U.S. PATENT DOCUMENTS

| | | | |
|---|---|---|---|
| 7,534,139 B2* | 5/2009 | Andre | H01R 13/5216 439/271 |
| 10,476,189 B2* | 11/2019 | Tsubaki | H01R 12/774 |
| 2004/0033729 A1 | 2/2004 | Patwardhan et al. | |
| 2013/0023140 A1* | 1/2013 | Kondo | H01R 13/5202 439/277 |
| 2016/0043500 A1* | 2/2016 | Mori | H01R 13/5219 439/271 |
| 2016/0197419 A1* | 7/2016 | Uchida | H01R 12/585 439/751 |

FOREIGN PATENT DOCUMENTS

| | | |
|---|---|---|
| CN | 104272100 A | 1/2015 |
| CN | 104620082 A | 5/2015 |
| CN | 105144492 A | 12/2015 |
| DE | 69811388 T2 | 7/2003 |
| DE | 102012005638 A1 | 9/2013 |
| DE | 10201208415 A1 | 6/2014 |
| DE | 102014002233 T5 | 1/2016 |
| EP | 1130363 A1 | 9/2001 |
| FR | 2930683 A1 | 10/2009 |
| JP | 1064616 A | 3/1998 |
| JP | 2000133370 A | 5/2000 |
| JP | 2013048019 A | 3/2013 |
| JP | 201432784 A | 2/2014 |
| JP | 2014032784 A | 2/2014 |

* cited by examiner

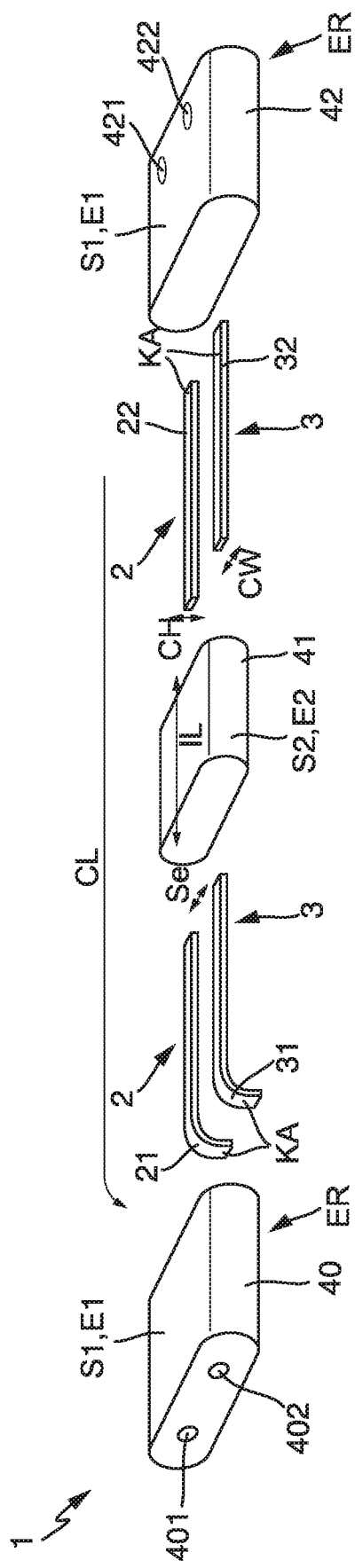
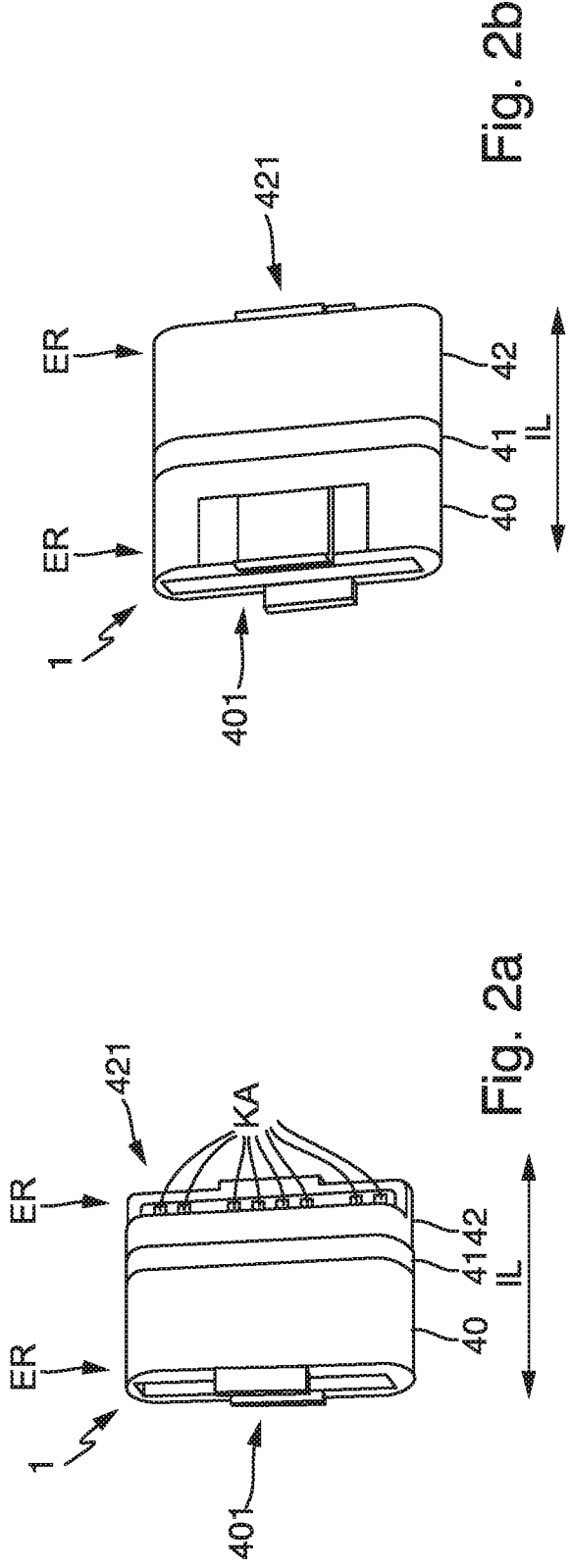

CONNECTING ELEMENT AND TRANSMITTER HOUSING WITH CONNECTING ELEMENT INSERTED THEREIN

CROSS-REFERENCE TO RELATED APPLICATIONS

The present application is related to and claims the priority benefit of German Patent Application No. 10 2016 125 350.2, filed on Dec. 22, 2016, and International Patent Application No. PCT/EP2017/080076, filed on Nov. 22, 2017, the entire contents of which are incorporated herein by reference.

TECHNICAL FIELD

The invention relates to a connecting element for electrical connecting of two electrical modules, which are arranged in a transmitter housing of a field device of automation technology, into which the connecting element is insertable. The invention relates, furthermore, to a transmitter housing having a connecting element of the invention inserted therein, as well as to a method for manufacturing the connecting element of the invention.

BACKGROUND

In automation technology, field devices are applied for determining and/or monitoring process variables. Referred to as field devices in the case of the present invention are, in principle, all measuring devices, which are applied near to the process and which deliver, or process, process relevant information. Involved, for example, are fill-level measuring devices, flow measuring devices, pressure- and temperature measuring devices, pH-redox potential measuring devices, conductivity measuring devices, etc., which register the corresponding process variables, fill level, flow, pressure, temperature, pH value, and conductivity. Such field devices are manufactured and sold in various embodiments by the E+H group of companies.

Field devices include, in such case, a transmitter unit arranged in a transmitter housing of the field device. The transmitter unit includes, as a rule, an evaluation unit comprising a first electrical module as well as a connection unit comprising a second module. The evaluation unit serves for producing an electrical signal, such as, for example, a voltage and/or an electrical current, representing the process variable. The connection unit serves for connecting external supply lines, for example, for energy supply of the field device and/or for forwarding the electrical signals produced by the evaluation unit.

Such field devices, which are also to be operated in explosion endangered regions, must, moreover, also satisfy very high safety requirements as regards explosion protection. In such case, of concern, especially, is safety to prevent the forming of sparks or at least to assure that a sparking arisen in the case of malfunction has no effects on the environment. For this, corresponding standards are defined in associated protection classes. In the protection class named "intrinsic safety" (Ex-i), explosion protection is achieved by making the values for electrical variables (electrical current, voltage, power) at all times, in each case, below predetermined limit values, in order that no ignition sparks are produced in the case of malfunction. In the additional protection class named "increased safety" (Ex-e), the explosion protection is achieved by making the spatial distances between two different electrical potentials sufficiently large that a spark formation in the case of malfunction cannot occur due to the distance.

In a large number of cases, it is desired to arrange the first and second modules spatially isolated from one another in the transmitter housing. For example, the above-mentioned protection classes require this for explosion protection. On the other hand, for the spatial isolation, for example, the electronics unit can be accommodated in an electronics compartment and the connection unit in a connection space separated therefrom by a partition. In this way, the first module accommodated in the electronics compartment is protected against intentional or unintended manipulations, especially contacts, in case a line or cable is connected to the second module accommodated in the connection space. Because of the spatial isolation, additionally, the connection space can also be opened under environmental conditions (for example, in the case of high humidity or in the case of precipitation) critical for the first module arranged in the electronics compartment, in which case the first module remains protected.

Needed for electrical connection (also, feedthrough) of the modules separated from one another spatially by a partition, protruding through the partition, is a connecting element, which has conductor elements and insulating material surrounding the conductor elements. Disclosed in DE 10 2012 108 415 A1, for example, is an interface between a sensor unit and an explosion resistant housing. The interface serves as a connecting element. European patent application EP 1 130 363 A1 discloses a flame proof connecting element. Disadvantageous in the connecting elements disclosed in the state of the art is that such have projecting contact pins, which are, in principle, sensitive to contacts, since they can be bent, for example, in the case of opening the connection space.

Therefore, it is advantageous to embed the conductor elements in an insulating body essentially determining the shape of the connecting element in such a manner that opposite end sections of the conductor elements are contactable by means of passageways in the insulating body. In the case of the embodiment of the insulating body, especially the choice of the insulating material, the following problematic is present. Thus, on the one hand, high requirements for form stability are placed on the insulating body. Due to their high modulus of elasticity, ceramic materials, for example, are excellently suited as material for the insulating body. On the other hand, high mechanical loadings can occur, for example, caused by large torques in the case of the assembly and/or in the case of working in the opened connection space in the region of the partition between the connection space and the electronics compartment. In such case, for example, in the region of a partition, the low tensile strength and the brittle fracture behavior of ceramic materials prove to be problems.

Additionally, it can be required that the insulating body be suitable for sealing the connection space and the electronics compartment from one another in the region of a partition; for this, an insulating body with a very low modulus of elasticity is required. The connecting elements known from the state of the art with homogeneous insulating bodies, and insulations, cannot fulfill these different and partially opposing requirements for the insulating body.

SUMMARY

An object of the invention is to provide a connecting element with an insulating body, which enables a safe and stable electrical connection of two electrical modules.

The object is achieved by a connecting element for electrical connecting of two electrical modules, which are arranged in a transmitter housing of a field device of automation technology, into which transmitter housing the connecting element is insertable. The connecting element includes at least two essentially rod-shaped metal conductor elements. Of course, the connecting element can also contain a larger number of such conductor elements (for example, four or eight). Each of the rod-shaped conductor elements has, in such case, two opposite end sections. The conductor elements are arranged in a defined separation relative to one another, especially they extend in parallel with one another. The connecting element includes a multi-membered insulating body, which surrounds the conductor elements and electrically insulates them from one another.

According to the invention, the insulating body is formed of two insulating body end segments of at least a first synthetic material and an insulating body intermediate segment of a second synthetic material different from the first synthetic material. The insulating body intermediate segment is arranged in a longitudinal direction of the multi-membered insulating body between the insulating body end segments. Passageways are formed in the insulating body end segments in intermediate segment far, end regions (ER) of the insulating body end segments in such a manner that contact areas on end sections of the conductor elements are electrically contactable by means of the passageways. The first synthetic material has a modulus of elasticity, which is greater than the modulus of elasticity of the second synthetic material.

Advantages of the connecting element of the invention include the following:

The conductor elements of the connecting element of the invention are advantageously completely embedded in the insulating body. The connecting elements thus have no contact pins projecting from the insulating body. Instead of that, the contact areas of the end sections of the conductor elements can be electrically contacted by means of the passageways in the insulating body intermediate segment far, end regions of the insulating body end segments. In such case, a separate passageway can be provided for each end section of each conductor element. Alternatively, also two or more or all end sections, which are arranged at the same end region of the insulating body end segment, can be contactable via one, shared passageway.

The insulating body of the connecting element of the invention is, on the one hand, form retaining, since the first synthetic material for the insulating body end segments has a high modulus of elasticity, especially a modulus of elasticity greater than that of the second synthetic material. The stability of the insulating body end segments is, consequently, not degraded by the passageways in the end region.

On the other hand, the insulating body has in its intermediate segment the second, elastic, synthetic material, which can be deformed more easily under the influence of mechanical stresses. Because of the multi-membered insulating body, the connecting element can be inserted into a transmitter housing in such a manner that the insulating body intermediate segment is located, for example, in the region of a partition. The second synthetic material with the low modulus of elasticity is suited, in such case, excellently as a sealing element, with which, for example, an electronics compartment and a connection space, which are insulated/isolated from one another by the partition, are sealed liquid tightly from one another.

The stability of the total connecting element is, in such case, supplementally reinforced by the rod-shaped conductor elements arranged essentially in parallel with one another, which are advantageously all arranged in parallel with the longitudinal direction of the insulating body.

The two mutually differing synthetic materials of the multi-membered insulating body can be injected around the conductor elements in a two component, injection molding method. In this way, the connecting element of the invention is especially easily manufacturable. In given cases, the two insulating body end segments can be connected with one another by a web, or by one or more frameworks, of the first synthetic material.

Especially, the first insulating body end segment surrounds all first of the two end sections of the conductor elements arranged especially essentially in parallel with one another, while the second insulating body end segment surrounds all second, first end section opposite, end sections of the conductor elements arranged especially essentially in parallel with one another. In this way, the longitudinal direction of the insulating body defined through the segments (i.e. insulating body end segments and insulating body intermediate segment) is also in parallel with all conductor elements arranged essentially in parallel with one another.

In an embodiment, the modulus of elasticity of the first synthetic material is greater by at least a factor of 5 than the modulus of elasticity of the second synthetic material. For example, the modulus of elasticity of the second synthetic material is less than 0.3 GPa (Giga Pascal), while the modulus of elasticity of the first synthetic material is greater than 1.5 GPa.

In an embodiment, the modulus of elasticity of the first synthetic material is greater by at least a factor of 10 than the modulus of elasticity of the second synthetic material.

In an embodiment, the two insulating body end segments are of the same, first synthetic material.

In an embodiment, the first synthetic material comprises a polyamide and/or a polyimide.

In an embodiment, the second synthetic material comprises an elastomer. Especially, it is a thermoplastic elastomer.

In an embodiment, the conductor elements are formed of an alloy at least containing brass and/or copper.

In an embodiment, the end sections of the conductor elements are coated with a corrosion protection layer. Especially, the corrosion protection layer is gold.

There are, in such case, no limitations for the cross section of the rod-shaped conductor elements: they can be rectangularly shaped, especially square, however, also round, especially circular or oval or elliptical. The rod-shaped conductor elements can be embodied as essentially rigid conductor elements. This increases the stability of the connecting elements.

In an embodiment, the rod-shaped conductor elements are all of equal length and same cross section.

In an embodiment, the cross section is rectangular with a height and width, wherein the width amounts to at least 1.5 times the height and the length is at least 10 times the height.

In an embodiment, the height amounts to at least 0.5 mm, the width to at least 1 mm and the length to at least 10 mm.

The connecting element can, in given cases, supplementally conform to one of the aforementioned standards (Ex-i and/or Ex-e), especially relative to the separation, the alloy, the length, width and/or height of the conductor elements, and/or relative to the first and second synthetic materials of the insulating body.

In an embodiment, the conductor elements are bent at at least one of their end sections, especially with a right angle.

In an embodiment, the conductor elements are bent at all end sections, which are arranged in the same insulating body end segment, i.e. all end sections arranged on an end region of the insulating body are bent.

In an embodiment, all end sections are bent.

The embodiment of a passageway formed in an end region for contacting the contact area of an end section is adapted as a function of whether the one or more end sections are bent or not. In the case of a bent end section, especially at a right angle, the plane of the contact area on the end section is no longer in parallel with the longitudinal direction, but, instead, especially essentially perpendicular to the longitudinal direction. In such case, the contact area is contactable via a passageway, which extends in a direction parallel to the longitudinal direction. In the case of an unbent end section, the plane of the contact area extends in parallel with the longitudinal direction. In such case, the contact area is contactable via a passageway, which extends in a direction perpendicular to the longitudinal direction. For the case, in which the contact area is located on bent end sections, it is advantageous that the bent section of the end section is about as long as the width of the conductor element and especially deviates by no more than 20% of the width of the conductor element. In the case of bent conductor elements, the contact areas are located on the bent section.

In an embodiment, the insulating body intermediate segment has in the longitudinal direction a lesser length than each of the insulating body end segments. Especially, each of the insulating body end segments is at least 20% longer than the insulating body intermediate segment.

In an embodiment, the insulating body has in a direction perpendicular to the longitudinal direction a greater dimension than the height of the conductor elements. Especially, the dimension of the insulating body is greater at least by a factor of 2.

In an embodiment, the insulating body intermediate segment has in a direction perpendicular to the longitudinal direction of the insulating body a greater dimension than the insulating body end segments, preferably than a region of the insulating body end segments adjoining the insulating body intermediate segment.

Regarding the transmitter housing, the object is achieved by a transmitter housing of a field device of automation technology. A first of the two modules is arranged in an electronics compartment of the transmitter housing and the second of the two modules is in a connection space of the transmitter housing. The electronics compartment and the connection space are separated from one another by a partition of the transmitter housing, wherein the partition contains a window. Insertable, especially reversibly, into the window is a connecting element, wherein a connecting element of the invention is inserted into the window. The connecting element inserted into the window is embodied to connect the first and second modules electrically with one another.

In an embodiment of the transmitter housing, the connecting element is inserted in such a manner into the window that the longitudinal direction of the insulating body is arranged essentially perpendicularly to the partition, wherein the insulating body intermediate segment of the inserted connecting element is embodied to seal the electronics compartment and the connection space liquid tightly from one another. The insulating body intermediate segment serves, thus, as a sealing element for the partition interrupted by the window.

In an embodiment of the transmitter housing of the invention, the window and the connecting element are embodied in such a manner that the connecting element is insertable into a defined inserted position in the window, or that the connecting element is insertable into the window in at least two defined, inserted positions, which are preferably symmetric relative to one another, wherein the two inserted positions lead to the same electrical connection of the two electrical modules. The symmetry is, for example, a mirror symmetry, whose symmetry axis extends especially in parallel with the longitudinal direction. In this way, the insertion of the connecting element into the transmitter housing is especially easy, and the connecting element cannot be incorrectly inserted.

In an advantageous embodiment of the transmitter housing of the invention, a first printed circuit board with the first module arranged thereon is arranged in the electronics compartment and a second printed circuit board with the second module arranged thereon is arranged in the connection space. Arranged on the first printed circuit board and the second printed circuit board are spring contact pins. Especially, the spring contact pins are soldered on. The connecting element inserted into the window is embodied to press with its contact areas on the spring contact pins in such a manner that the end sections surrounded by the first of the two insulating body end segments are electrically connected with the spring contact pins arranged on the first printed circuit board, and the end sections surrounded by the second of the two insulating body end segments are electrically connected with the spring contact pins arranged on the second printed circuit board.

In an embodiment, the passageways have a depth, which, in each case, is adapted in such a manner to the spring contact pins that the spring contact pins, in each case, protrude in with a large part of their length, especially essentially completely, into the end regions of the insulating body end segments. Referred to as length of the spring contact pins is, in such case, the expansion, which extends in a perpendicular direction of the printed circuit board, on which the spring contact pins are mounted. In this way, an especially space saving arrangement is achieved.

Regarding the method, the object is achieved by a method for manufacturing a connecting element of the invention, comprising steps as follows: prefabricating the conductor elements; and embedding the conductor elements in the insulating body by means of at least one injection molding method.

In an embodiment of the method, in a first injection molding method, the two insulating body end segments are injection molded around the conductor elements and, in a second injection molding method, especially later in time than the first injection molding method, the insulating body intermediate segment is injection molded around the conductor elements. In this way, the insulating body intermediate segment is injection molded between the insulating body end segments.

BRIEF DESCRIPTION OF THE DRAWINGS

The invention will now be explained in greater detail based on the appended drawing, wherein equal reference characters refer to equal features; when perspicuity requires or it otherwise appears sensible, already presented reference characters are omitted in subsequent figures. The figures of the drawing show as follows:

FIG. 1 shows an exploded view of the connecting element of the invention;

FIGS. 2a and 2b show perspective views of embodiments of connecting elements of the invention;

DETAILED DESCRIPTION

Figure 3:
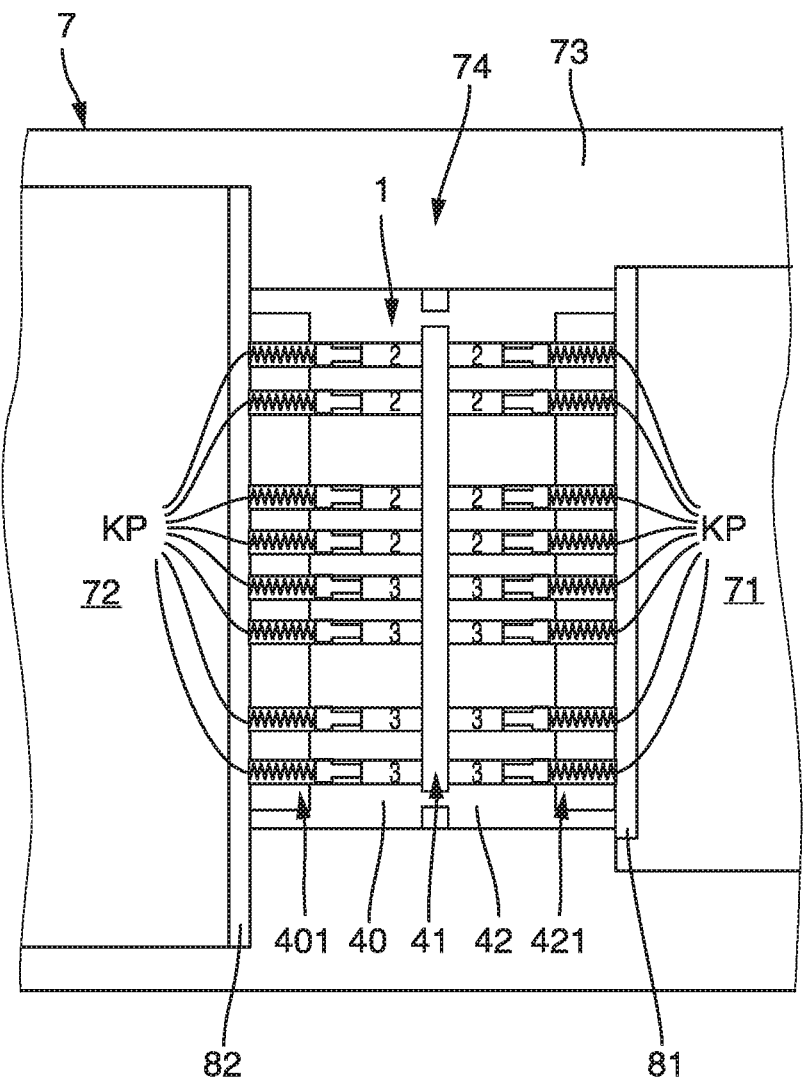
FIG. 3 shows a transmitter housing and a connecting element of the invention inserted therein.

FIG. 1 shows in an exploded view an embodiment of the connecting element of the invention 1 having a first rod-shaped conductor element 2 and a second rod-shaped conductor element 3. The two conductor elements are arranged in parallel with one another, with a separation Se, and have equal lengths CL, equal heights CH and equal widths CW. The conductor elements 2,3 are shown in the exploded view separated into two parts. They are, however, of course, continuous and are, in each case, a single, rod-shaped conductor element 2,3.

The first conductor element 2 includes a first end section 21, which is bent 90-degrees, and, opposite the first end section 21, a second end section 22, which is not bent. Also, the second conductor element 3 includes a first end section 31, which is bent 90-degrees and, opposite the first end section 31, a second end section 32, which is not bent. On the end sections 21,22,31,32 are located contact areas KA, which are provided for electrical connection. In the case of the bent conductor elements 2,3, contact areas KA are located on the bent sections.

The conductor elements are surrounded by an insulating body 4 multi-membered in its longitudinal direction IL with a number of insulating body segments 40,41,42. The longitudinal direction IL extends, in such case, essentially in parallel with the longitudinal direction of the rod-shaped conductor elements 2,3. The multi-membered insulating body 4 is composed in its longitudinal direction IL of: a first insulating body end segment 40 of a first synthetic material S1 having a first modulus of elasticity E1, an insulating body intermediate segment 41 of a second synthetic material S2 with a 10 times lower modulus of elasticity E2, and a second insulating body end segment 42, again, of the first synthetic material S1. The contact areas KA of the conductor elements 2,3 are contactable by means of passageways 401,402,421, 422 formed in the molding of the insulating body end segments 40,42. In such case, such as shown here, a separate passageway 401,402,421,422 can be provided for each end section 31,21, 22,32 of each conductor element 2,3.

Alternatively, there can also be provided on each of the two end regions ER of the insulating body end segments 40,42 only single passageways 401,421, by means of which all contact areas KA of all conductor elements 2,3 are contactable. Another option provides that the passageways 401,402 have at least one common section. Such is shown in FIGS. 2a and 2b, in which other examples of embodiments of the connecting element 1 are shown in perspective view.

As also already present in the case shown in FIG. 1, in FIG. 2a, all end sections 21,31 of the conductor elements 2,3 are bent, which are arranged at the end region ER of the first insulating body end segment 40 and the insulating body end segment 40 surrounds them there. All end sections 22,32, which are arranged at the end region ER of the second insulating body end segment 42 and which are surrounded there by the second insulating body end segment 42, are, in contrast, not bent. Therefore, the passageway 421 extends here (compare FIG. 1) in a direction perpendicular to the longitudinal direction IL.

In contrast with the example of an embodiment of FIG. 1, the contact areas KA are contactable here by means of sectionally shared passageways 401, 421 for all end sections 21, 22; 31,32 arranged at the end regions ER. Especially for the case, in which a plurality of conductor elements 2,3 (in one case, eight) are provided, it can be advantageous to provide at each of the two end regions ER only one shared passageway 401,421 or a passageway 401,421 having a shared section.

An example of an embodiment similar to that of FIG. 2a is shown in FIG. 2b, wherein, in such case, all end sections 21,22,31,32 are bent. Therefore, the two passageways 401, 402 extend in a direction parallel to the longitudinal direction IL. Of course, it is also possible within the scope of the invention that only a selection of end sections 21 of the conductor elements 2,3 are contactable via one, shared passageway 401, while another selection of end sections 31 are contactable via another shared passageway 402.

FIG. 3 shows a sectional view of a transmitter housing 7 of the invention with a connecting element 1 inserted in a window 74. The transmitter housing includes a connection space 72 and an electronics compartment 71 separated therefrom by a partition 73. Soldered in the electronics compartment 71 to a first printed circuit board 81 are spring contact pins KP (also referred to as "pogo pins") known per se from the state of the art. Also soldered in connection space 72 to a second printed circuit board 82 are other spring contact pins KP. The connecting element 1 in this embodiment is embodied similarly to that of the example of an embodiment shown in FIG. 2b, namely with conductor elements 2,3, which are bent on all end sections 21,22,31,32.

The spring contact pins KP extend in this embodiment advantageously completely into the passageways 401,402 of the insulating body end segments 40,42 and are in electrically conductive connection with the contact areas KA (here not shown). In this way, the connecting element 1 of the invention provides, on the one hand, the electrical connection of the two electrical modules 61,62 (not shown), which are arranged on the first printed circuit board 81 and the second printed circuit board 82, respectively. On the other hand, the insulating body intermediate segment 41 of the insulating body 4 liquid-tightly seals the electronics compartment 71 and the connection space 72 from one another.

The insulating body intermediate segment 41 serves, thus, simultaneously as a sealing element for the partition 73 interrupted by the window 74. Such is advantageously achieved by the comparatively low modulus of elasticity E2 of insulating body intermediate segment 41 (here an elastomer). Additionally, the insulating body intermediate segment 41 is larger in a direction perpendicular to the longitudinal direction IL of the insulating body 4 than the insulating body end segments 40,42. In this way, an optimal sealing is achieved, since in the inserting of the connecting element 1, on the one hand, larger stresses act on the insulating body intermediate segment 41 and this, on the other hand, can be deformed more easily than the insulating body end segments 40,42, because of the lower modulus of elasticity E2

Figure 4:
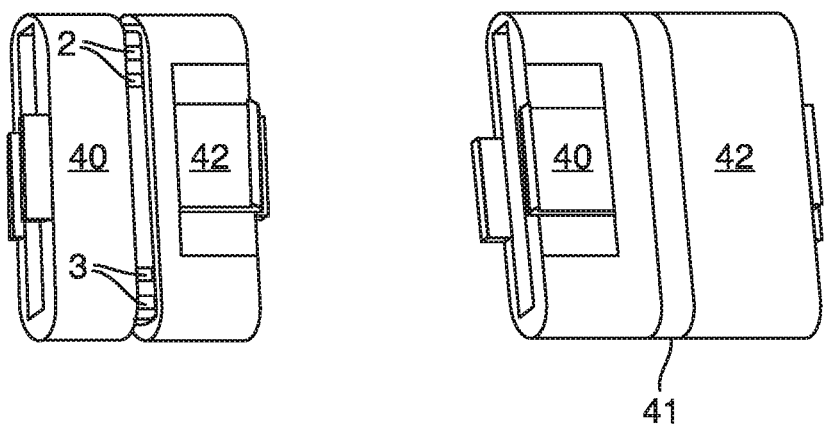
FIG. 4 shows a method for manufacturing the connecting element.

FIG. 4 shows a method for manufacturing the connecting element 1 of the invention, which is also shown in FIG. 2b. First, the conductor elements 2,3 (four shown) are prefabricated; this includes also the applying of the corrosion protection layer of gold on the end sections 21,22,31,32. Then, the insulating body end segments 40,42 are injection molded around the conductor elements 2,3 in a first step of a two component, injection molding method. In such case, insulating body end segments 40,42 are connected with one another via a narrow web. In a second step of the two component, injection molding method, the insulating body intermediate segment 41 is injection molded around the conductor elements 2,3 between the insulating body end segments 40,42.

The invention claimed is:

1. A transmitter housing for a field device of automation technology, the housing comprising:
    an electronics compartment in which a first module is disposed;
    a connection space in which a second module is dispose;
    a first printed circuit board with the first module arranged thereon disposed in the electronics compartment; and
    a second printed circuit board with the second module arranged thereon is disposed in the connection space, wherein spring contact pins are included on each of the first printed circuit board and the second printed circuit,
    wherein the electronics compartment and the connection space are separated from one another by a partition, the partition including a window configured to enable a connecting element to be reversibly inserted therein,
    wherein the connecting element comprises:
        at least two substantially rod-shaped metal conductor elements, each with two opposing end sections, the conductor elements arranged at a defined separation relative to one another; and
        a multi-membered insulating body surrounding the conductor elements and electrically insulating them from one another, the multi-membered insulating body including a first insulating body end segment and a second insulating body end segment of at least a first synthetic material and including an insulating body intermediate segment of a second synthetic material different from the first synthetic material, wherein the intermediate segment is arranged in a longitudinal direction of the insulating body between the end segments,
    wherein the insulating body further includes passageways formed through end regions of the end segments of the insulating body such that contact areas on respective end sections of the at least two conductor elements are electrically contactable via the passageways, and
    wherein the first synthetic material has a modulus of elasticity that is greater than a modulus of elasticity of the second synthetic material, and
    wherein the connecting element is inserted into the window, the connecting element configured to electrically connect the first module and the second module with one another, and
    wherein the connecting element is configured to press with its contact areas on the spring contact pins when inserted into the window such that:
        the end sections of the at least two conductor elements surrounded by the first insulating body end segment are electrically contacted by the spring contact pins arranged on the first printed circuit board; and
        the end sections of the at least two conductor elements surrounded by the second insulating body end segment are electrically contacted by the spring contact pins arranged on the second printed circuit board.

2. The transmitter housing of claim 1, wherein the modulus of elasticity of the first synthetic material is greater than the modulus of elasticity of the second synthetic material by at least a factor of 5.

3. The transmitter housing of claim 1, wherein the first synthetic material includes a polyamide and/or a polyimide, and wherein the second synthetic material includes an elastomer.

4. The transmitter housing of claim 1, wherein the conductor elements are an alloy at least including brass and/or copper, and wherein the end sections of the conductor elements are coated with a corrosion protection layer.

5. The connecting element transmitter housing of claim 4, wherein the corrosion protection layer is gold.

6. The transmitter housing of claim 1, wherein:
    the conductor elements are all of equal length and same cross-section having a height and a width;
    the width is at least 1.5 times the height, and the length is at least 10 times the height; and
    the height is at least 0.5 millimeters (mm), the width is at least 1 mm, and the length is at least 10 mm.

7. The transmitter housing of claim 1, wherein each conductor element is bent at an angle at or near at least one of its end sections.

8. The transmitter housing of claim 1, wherein the insulating body intermediate segment has a lesser length than each of the insulating body end segments in the longitudinal direction of the insulating body.

9. The transmitter housing of claim 1, wherein the insulating body has a greater dimension in a direction perpendicular to the longitudinal direction of the insulating body than the height of the conductor elements by at least by a factor of 2, and
    wherein the insulating body intermediate segment has a greater dimension than the insulating body end segments in a direction perpendicular to the longitudinal direction of the insulating body.

10. The transmitter housing of claim 1, wherein the connecting element is inserted into the window such that the longitudinal direction of the insulating body is arranged essentially perpendicularly to the partition, and
    wherein the insulating body intermediate segment of the connecting element is configured to seal the electronics compartment and the connection space from one another in a liquid-tight manner.

11. The transmitter housing of claim 1, wherein the window and the connecting element are configured such that the connecting element is insertable into a defined inserted position in the window or such that the connecting element is insertable into the window in at least two defined inserted positions, which at least two positions are symmetric relative to one another and lead to the same electrical connection of the two electrical modules.

12. The transmitter housing of claim 1, wherein the insulating body passageways each have a depth configured such that the spring contact pins each extend completely into the end regions of the insulating body end segments.

13. The transmitter housing of claim 1, wherein the spring contact pins are soldered onto the first printed circuit board and the second printed circuit board.

14. The transmitter housing of claim 1, wherein the conductor elements are prefabricated and are embedded in the insulating body using at least one injection molding process.

15. The transmitter housing of claim 14, wherein the at least one injection molding process includes:

a first injection molding process in which the two insulating body end segments are injection molded around the conductor elements; and a second injection molding process in which the insulating body intermediate segment is injection molded around the conductor elements after the first injection molding process.

16. A transmitter housing for a field device of automation technology, the housing comprising: an electronics compartment in which a first module is disposed, wherein the first module includes contact pins, which extend therefrom; and a connection space in which a second module is disposed, wherein the second module includes contact pins, which extend therefrom, wherein the electronics compartment and the connection space are separated from one another by a partition, the partition including a window configured to enable a connecting element to be reversibly inserted therein, wherein the connecting element comprises: at least two substantially rod-shaped metal conductor elements, each with two opposing end sections, the conductor elements arranged at a defined separation relative to one another; and a multi-membered insulating body surrounding the conductor elements and electrically insulating them from one another, the multi-membered insulating body including a first insulating body end segment and a second insulating body end segment of at least a first synthetic material and including an insulating body intermediate segment of a second synthetic material different from the first synthetic material, wherein the intermediate segment is arranged in a longitudinal direction of the insulating body between the end segments, wherein the insulating body further includes passageways formed through end regions of the end segments of the insulating body such that contact areas on respective end sections of the at least two conductor elements are electrically contactable via the passageways, and wherein the first synthetic material has a modulus of elasticity that is greater than a modulus of elasticity of the second synthetic material, wherein the connecting element is inserted into the window, the connecting element configured to electrically connect the first module and the second module with one another, and wherein the insulating body passageways each have a depth configured such that the contact pins of the first and second modules, respectively, extend substantially into the end regions of the insulating body end segments.

17. The transmitter housing of claim 16, wherein the insulating body passageways each have a depth configured such that the spring contact pins each extend completely into the end regions of the insulating body end segments.

* * * * *